(12) United States Patent
Wakayama

(10) Patent No.: US 9,711,107 B2
(45) Date of Patent: Jul. 18, 2017

(54) IMAGE DRAWING/DISPLAYING DEVICE

(71) Applicant: PANASONIC CORPORATION, Osaka (JP)

(72) Inventor: Yorihiko Wakayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 514 days.

(21) Appl. No.: 14/303,453

(22) Filed: Jun. 12, 2014

(65) Prior Publication Data
US 2014/0292791 A1 Oct. 2, 2014

Related U.S. Application Data

(63) Continuation of application No. PCT/JP2012/007956, filed on Dec. 12, 2012.

(30) Foreign Application Priority Data

Jan. 27, 2012 (JP) .................. 2012-015345

(51) Int. Cl.
*G09G 5/00* (2006.01)
*G09G 5/14* (2006.01)
(Continued)

(52) U.S. Cl.
CPC ............. *G09G 5/001* (2013.01); *G06F 3/048* (2013.01); *G06T 11/20* (2013.01); *G09G 5/14* (2013.01);
(Continued)

(58) Field of Classification Search
None
See application file for complete search history.

(56) References Cited

U.S. PATENT DOCUMENTS

| 5,574,483 A | 11/1996 | Nishizawa |
| 2011/0018886 A1* | 1/2011 | Levasseur ............... G09G 5/393 345/543 |
| 2013/0162681 A1* | 6/2013 | Peterson ............... G06T 3/0093 345/647 |

FOREIGN PATENT DOCUMENTS

| JP | 61-22391 A | 1/1986 |
| JP | 02-217893 A | 8/1990 |

(Continued)

OTHER PUBLICATIONS

International Search Report issued in International Application No. PCT/JP2012/007956 with Date of mailing Mar. 19, 2013, with English Translation.

*Primary Examiner* — Ke Xiao
*Assistant Examiner* — Jed-Justin Imperial
(74) *Attorney, Agent, or Firm* — McDermott Will & Emery LLP

(57) ABSTRACT

A flag memory is provided which stores a flag indicating whether or not a corresponding pixel is in the initial state. When writing has been performed on an image memory by a drawing unit, a value of the flag of a corresponding pixel is changed from a first value indicating that the pixel is in the initial state to a second value indicating that the pixel is not in the initial state. When a display unit reads a pixel value from the image memory, a flag corresponding to the pixel is read from the flag memory, and if the flag still has the first value, an initial pixel value is supplied to the display unit, and otherwise, a pixel value read from the image memory is supplied to the display unit.

12 Claims, 11 Drawing Sheets

(51) Int. Cl.
  *G09G 5/39*      (2006.01)
  *G09G 5/393*     (2006.01)
  *G06T 11/20*     (2006.01)
  *G06F 3/048*     (2013.01)

(52) U.S. Cl.
  CPC ............... *G09G 5/39* (2013.01); *G09G 5/393* (2013.01); *G09G 2340/10* (2013.01)

(56) References Cited

FOREIGN PATENT DOCUMENTS

| | | |
|---|---|---|
| JP | 06-83297 A | 3/1994 |
| JP | 2003-288067 A | 10/2003 |
| JP | 2004-166017 A | 6/2004 |
| JP | 2006-276269 A | 10/2006 |

* cited by examiner

IMAGE DRAWING/DISPLAYING DEVICE

CROSS-REFERENCE TO RELATED APPLICATIONS

This is a continuation of International Application No. PCT/JP2012/007956 filed on Dec. 12, 2012, which claims priority to Japanese Patent Application No. 2012-015345 filed on Jan. 27, 2012. The entire disclosures of these applications are incorporated by reference herein.

BACKGROUND

The present disclosure relates to technologies for reducing memory access in devices for drawing and displaying images.

In recent years, computer graphics have been widely used in user interfaces for mobile telephones or digital televisions, and systems for producing images for video games, in order to allow for man-machine interactive operation, resulting in improved user experience. On the other hand, as technologies have been developed, display devices used in apparatuses have had higher definition, and therefore, there has been a demand for an image drawing/displaying device having higher performance. The frequency of memory access for drawing or displaying has increased, resulting in an increase in power consumption.

To address this, a technique has been proposed in which when a first image and a second image which are stored in a memory are displayed with the second image being superimposed on the first image, a start line number of a portion in which the second image is to be displayed, and the number of lines to be displayed, are calculated, and when a line in the second image contains only transparent pixels, only the first image in the memory is accessed for that line, whereby useless memory access is reduced (see Japanese Unexamined Patent Publication No. 2003-288067).

Also, when a graphic is drawn as the second image, a draw range in the horizontal direction is calculated, a desired range on each line is determined to be a superimposition display region, and for the other portion, only the first image in the memory is accessed, whereby useless memory access is reduced (see Japanese Unexamined Patent Publication No. 2004-166017).

However, in the above conventional techniques, it is assumed that images to be superimposed together are rectangular. The above conventional techniques cannot be easily applied to superimposition of graphics having any arbitrary shapes, such as computer graphics. In addition, a counter or a comparator is required for each of images to be superimposed together. Therefore, the above conventional techniques cannot be practically applied to tens of thousands of computer graphics which are typically displayed at once.

For example, when ten thousand images are processed using the technique described in Japanese Unexamined Patent Publication No. 2003-288067 above, ten thousand comparators for comparing the line number of each line and the start line number of each image, and ten thousand counters for counting down the lines to the end of memory access to each image, are required, which is not practically feasible.

SUMMARY

The present disclosure describes implementations of an image drawing/displaying device in which even when a large number of images are superimposed together, memory access can be reduced.

To solve the above conventional problems, in an example image drawing/displaying device of the present disclosure, even when a large number of complicated images, such as computer graphics, are superimposed together, a flag memory is provided which stores a flag indicating whether or not a corresponding one of pixels on a screen is in the initial state, and states of the pixels in the image memory are managed using the flag memory, instead of managing the shape of each image using line numbers.

Specifically, a first example image drawing/displaying device of the present disclosure includes an image memory configured to store data of an image to be displayed on a screen, an initial pixel value storage unit configured to store an initial pixel value, a flag memory configured to store a flag indicating whether or not a corresponding one of pixels of the screen is in an initial state, a drawing unit configured to write data of an image to be drawn to the image memory, a non-initialization unit configured to, when writing has been performed on the image memory, changes a value of the flag of a corresponding pixel in the flag memory from a first value indicating that the pixel is in the initial state to a second value indicating that the pixel is not in the initial state, a display unit configured to read a pixel value from the image memory to display an image on the screen, and a flag determination unit configured to, when the display unit reads a pixel value from the image memory, read the flag corresponding to the pixel from the flag memory to determine whether or not the pixel is in the initial state, and if the flag still has the first value, supply the initial pixel value stored in the initial pixel value storage unit to the display unit, and otherwise, read the pixel value from the image memory and supplying the pixel value to the display unit.

A second example image drawing/displaying device of the present disclosure includes an image memory configured to store data of an image to be displayed on a screen, an initial pixel value storage unit configured to store an initial pixel value, a flag memory configured to store a flag indicating whether or not a corresponding one of pixels of the screen is in an initial state, a drawing unit configured to write data of an image to be drawn to the image memory, a non-initialization unit configured to, when writing has been performed on the image memory, changes a value of the flag of a corresponding pixel in the flag memory from a first value indicating that the pixel in the initial state to a second value indicating that the pixel is not in the initial state, an unwritten pixel initialization unit configured to, after drawing has been completed by the drawing unit, checks the value of each flag in the flag memory, and if the flag still has the first value, rewrite a pixel value corresponding to the flag in the image memory with the initial pixel value stored in the initial pixel value storage unit, and a display unit configured to, after writing has been completed by the unwritten pixel initialization unit, read a pixel value from the image memory to display an image on the screen.

According to the image drawing/displaying device of the present disclosure, write access to the image memory for initialization of pixels, read access to pixels in the initial state, etc., can be reduced, and therefore, a complicated image can be drawn with a smaller number of times of memory access.

DETAILED DESCRIPTION

Embodiments of the present disclosure will now be described with reference to the accompanying drawings.

First Embodiment

Figure 1:
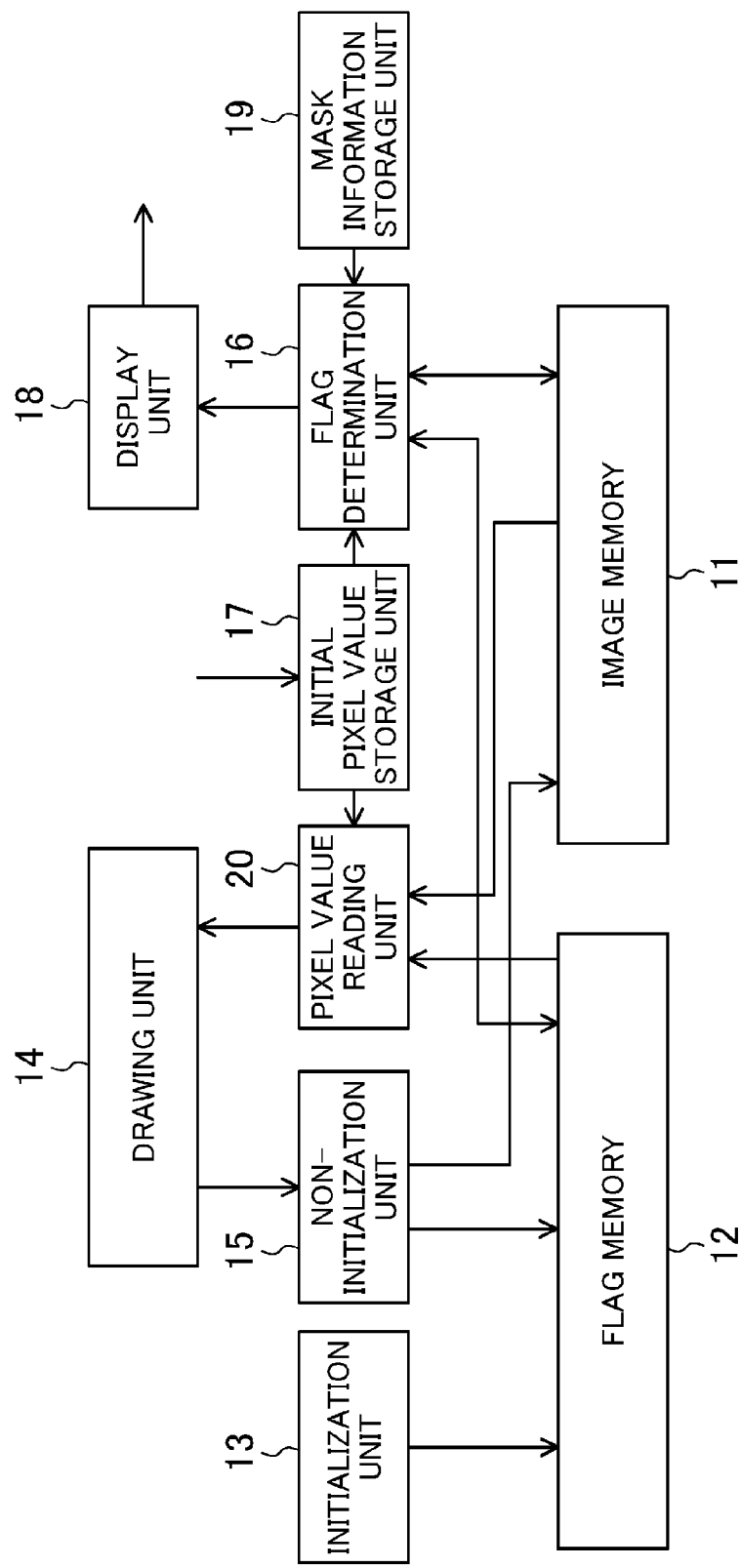
FIG. 1 is a block diagram showing a configuration of an image drawing/displaying device according to a first embodiment of the present disclosure.

FIG. 1 is a block diagram showing a configuration of an image drawing/displaying device according to a first embodiment of the present disclosure. The image drawing/displaying device of FIG. 1 includes an image memory 11, a flag memory 12, an initialization unit 13, a drawing unit 14, a non-initialization unit 15, a flag determination unit 16, an initial pixel value storage unit 17, a display unit 18, a mask information storage unit 19, and a pixel value reading unit 20.

The image memory 11 is configured to store an image to be displayed. The flag memory 12 is configured to store, as a 1-bit flag, information indicating whether or not a corresponding pixel in a screen is in the initial state. The initialization unit 13 is configured to change the values of all flags in the flag memory 12 to "0" which indicates that a pixel is in the initial state, before beginning to perform a process on one screen of data. The drawing unit 14 is configured to write image data of a graphic etc. to the image memory 11 via the non-initialization unit 15. The non-initialization unit 15 is configured to change the value of the flag of a pixel in the flag memory 12 from "0" (initial state) to "1" which indicates that a pixel in the non-initial state when writing has been performed on the pixel in the image memory 11. The initial pixel value storage unit 17 is configured to store the value of a pixel in the screen in the initial state as an initial pixel value. The display unit 18 is configured to read image data from the image memory 11 via the flag determination unit 16, and display the image data.

The flag determination unit 16 is configured to, when the display unit 18 reads the value of a pixel from the image memory 11, read a corresponding flag in the flag memory 12 based on the coordinate values of the pixel to determine whether or not the pixel is in the initial state, and if the flag is still "0" (initial state), supply the initial pixel value from the initial pixel value storage unit 17 to the display unit 18, and otherwise, i.e., if the flag is "1" (non-initial state), read the pixel value in the image memory 11 and supply the pixel value to the display unit 18. The mask information storage unit 19 and the pixel value reading unit 20 will be described below.

Figure 2:
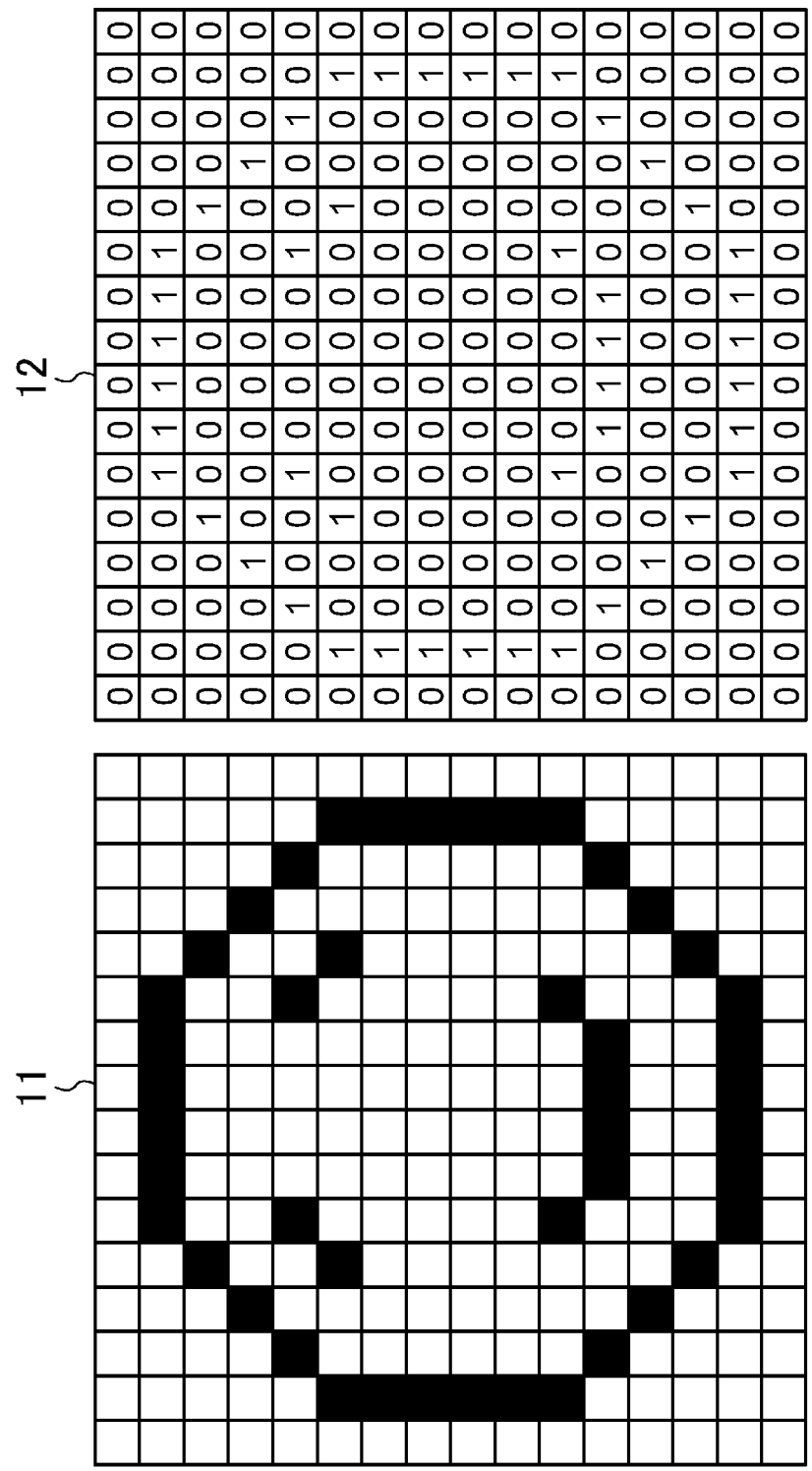
FIG. 2 is a diagram showing example states before initialization of an image memory and a flag memory of FIG. 1.

FIG. 2 is a diagram showing example states before initialization of the image memory 11 and the flag memory 12 of FIG. 1. Here, for the sake of simplicity, the screen includes 16 pixels×16 pixels. The image memory 11 of FIG. 2 indicates that a picture of a face is drawn on white background. The flag memory 12 of FIG. 2 indicates that flags corresponding to pixels remaining the white background in the image memory 11 are "0" (initial state) and flags corresponding to pixels constituting the picture are "1" (non-initial state).

For each pixel, the image memory 11 stores 32-bit data (RGBA) or 24-bit data (color difference signal YUV) in computer graphics. Compared to the flag memory 12 which stores a 1-bit flag for each pixel, the image memory 11 stores a larger amount of information per pixel.

Figure 3:
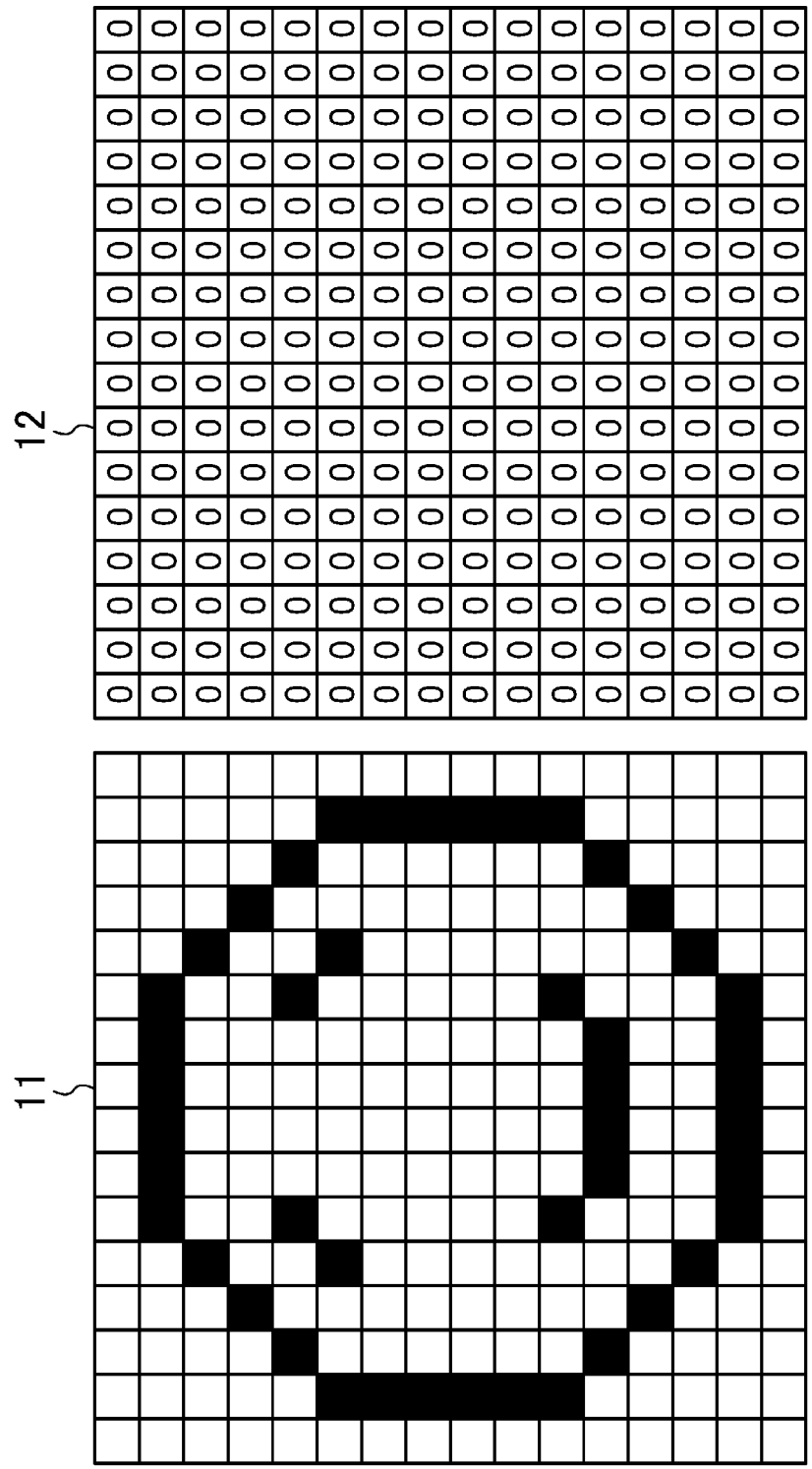
FIG. 3 is a diagram showing example states immediately after initialization of the image memory and the flag memory.

FIG. 3 is a diagram showing example states immediately after initialization of the image memory 11 and the flag memory 12. The initialization unit 13 has changed all flags in the flag memory 12 to "0" (initial state). In contrast to this, even after the flag memory 12 has been initialized, the image memory 11 remains unchanged from the state before the initialization. On the other hand, at this time, the initial pixel value storage unit 17 stores an initial pixel value received from the outside.

Next, the drawing unit 14 outputs the coordinate values and pixel values of pixels constituting a graphic to be drawn, to replace the pixel values in the image memory 11 corresponding to the output coordinate values with the output pixel values. At the same time, the non-initialization unit 15 changes flags in the flag memory 12 corresponding to the output coordinate values to "1" (non-initial state).

Figure 4:
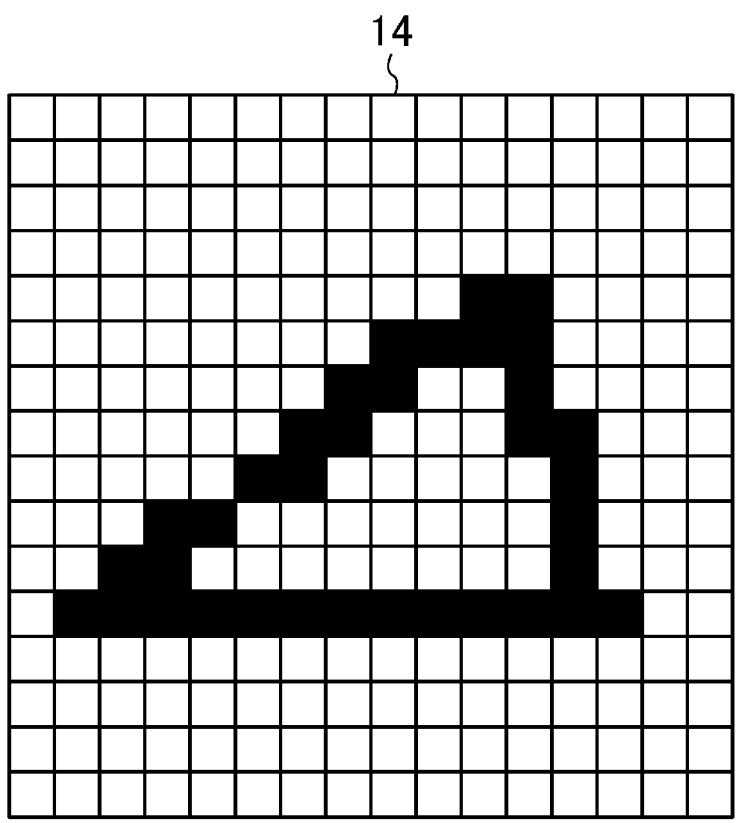
FIG. 4 is a diagram showing an example graphic which is to be drawn by a drawing unit of FIG. 1.

FIG. 4 is a diagram showing an example graphic which is to be drawn by the drawing unit 14 of FIG. 1. Here, it is assumed that a triangle which is wider than it is high to be drawn.

Figure 5:
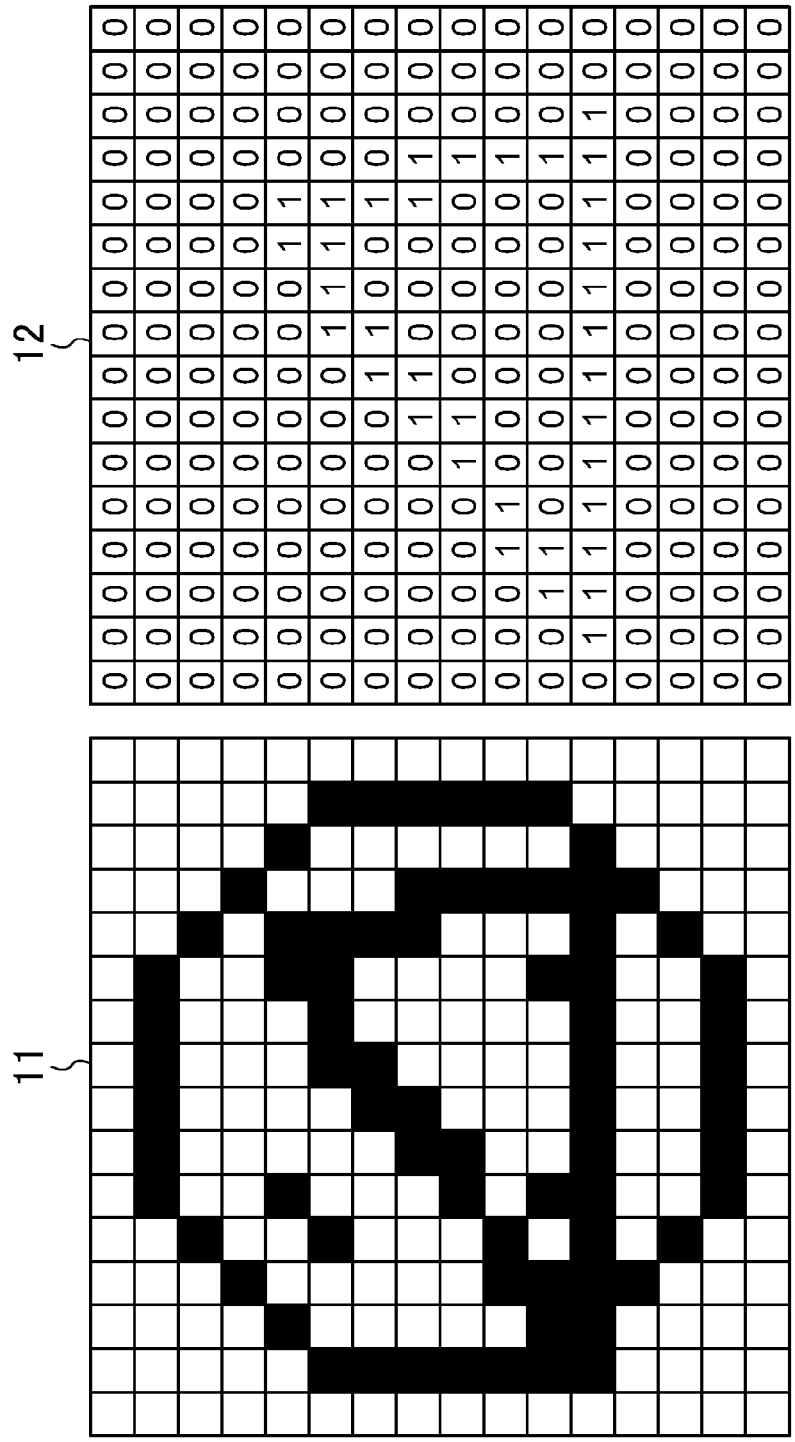
FIG. 5 is a diagram showing example states of the image memory and the flag memory immediately after the graphic of FIG. 4 has been drawn.

FIG. 5 is a diagram showing example states of the image memory 11 and the flag memory 12 immediately after the graphic of FIG. 4 has been drawn. In the image memory 11 of FIG. 5, the values of pixels corresponding to the drawing data of FIG. 4 have been changed from those of FIG. 3. In the flag memory 12, the value "1" (non-initial state) has been written to form the shape of the drawing data of FIG. 4.

Figure 6:
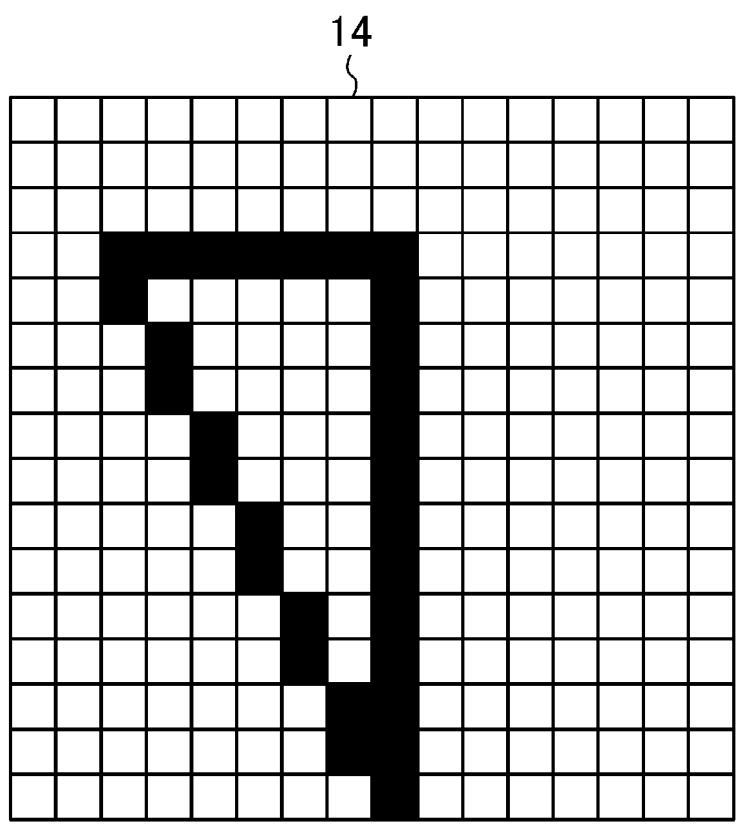
FIG. 6 is a diagram showing an example graphic which is to be additionally drawn by the drawing unit of FIG. 1.

FIG. 6 is a diagram showing an example graphic which is to be additionally drawn by the drawing unit 14 of FIG. 1. Here, it is assumed that a triangle which is higher than it is wide is to be drawn.

Figure 7:
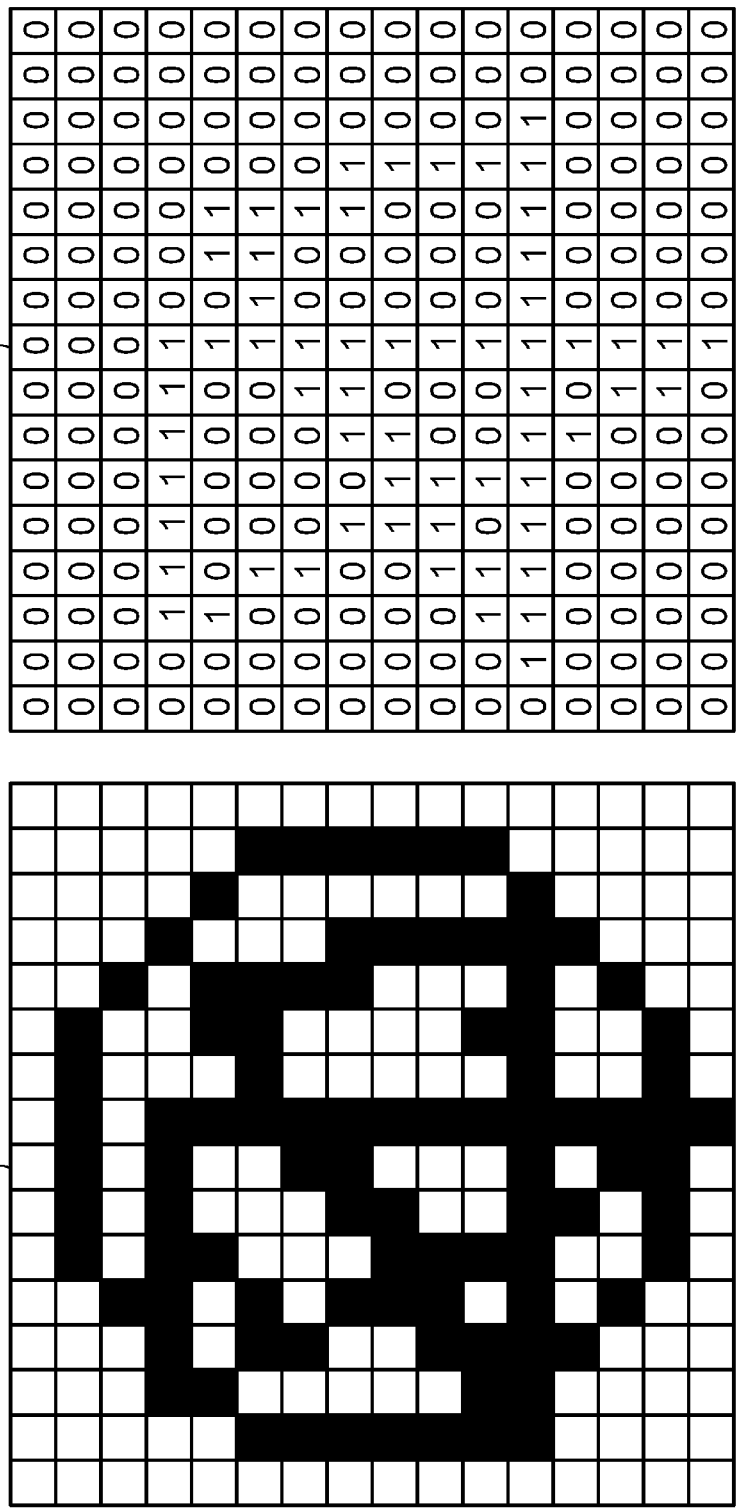
FIG. 7 is a diagram showing example states of the image memory and the flag memory immediately after the graphic of FIG. 6 has been drawn.

FIG. 7 is a diagram showing example states of the image memory 11 and the flag memory 12 immediately after the graphic of FIG. 6 has been drawn. In the image memory 11 of FIG. 7, the pixel values of a portion corresponding to the drawing data of FIG. 6 have been changed from those of FIG. 5, and therefore, the past and current graphic images coexist. In the flag memory 12, the value "1" (non-initial state) has been written to form the shape of the drawing data of FIG. 6 over the data of FIG. 5.

Figure 8:
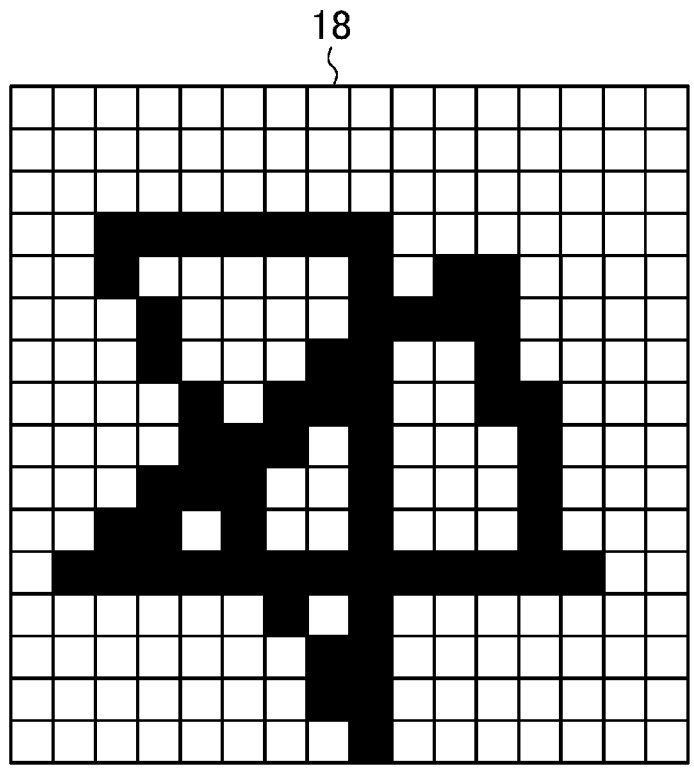
FIG. 8 is a diagram showing an example output of a display unit of FIG. 1 in the state of FIG. 7.

FIG. 8 is a diagram showing an example output of the display unit 18 of FIG. 1 in the state of FIG. 7. After the drawing has been completed by the drawing unit 14, when the display unit 18 reads image data from the image memory 11 in order to display the image data, the flag determination unit 16 checks the states of the flags in the flag memory 12 at the coordinate points corresponding to the image data. If the flag is still "0" (initial state), the flag determination unit 16 transfers the initial pixel value stored in the initial pixel value storage unit 17 to the display unit 18. If the flag is "1" (non-initial state), the flag determination unit 16 reads the value of a pixel at the corresponding coordinate point from the image memory 11 and transfers the pixel value to the display unit 18. Thus, although the image memory 11 is in the state of FIG. 7, the display unit 18 reads from the image memory 11 only the values of pixels corresponding to flags of "1" (non-initial state) in the flag memory 12 of FIG. 7, and obtains the initial pixel value from the initial pixel value storage unit 17 for the other pixels, whereby the output image shown in FIG. 8 is obtained.

As described above, according to this embodiment, in order to clear the screen when computer graphics are drawn, it is only necessary to set all flags in the flag memory 12 to "0" (initial state) in addition to writing the single initial pixel value of the image memory 11 to the initial pixel value storage unit 17.

For example, it is assumed that a computer graphic is drawn in 10% (1920×1080÷10=207,360 pixels) of the screen of 1920 pixels (height)×1080 pixels (width), and each pixel has 4-byte data. Conventionally, data of 1920×1080× 4=8,294,400 bytes is written to the image memory 11 in order to clear the screen, data of 207,360×4=829,440 bytes is written to the image memory 11 in order to draw the graphic, and data of 8,294,400 bytes is read from the image memory 11 in order to display the graphic, and therefore, data of a total of 17,418,240 bytes needs to be accessed. In this embodiment, data of 1920×1080÷8=259,200 bytes is written to the flag memory 12 in order to clear the screen, data of 192×1080÷10÷8=25,920 bytes is written to the flag memory 12 in order to draw the graphic, data of 1920× 1080÷10×4=829,440 bytes is written to the image memory 11 in order to draw the graphic, data of 1920×1080÷8=259, 200 bytes is read from the flag memory 12 in order to display the graphic, and data of 1920×1080÷10×4=829,440 bytes is read from the image memory 11 in order to display the graphic, and therefore, data of a total of 2,203,200 bytes needs to be accessed. As a result, the amount of access can be reduced by a factor of 7.9.

Next, the mask information storage unit 19 will be described. The mask information storage unit 19 of FIG. 1 is configured to store mask information indicating which of a plurality of components of each pixel is forbidden to be initialized.

Figure 9:
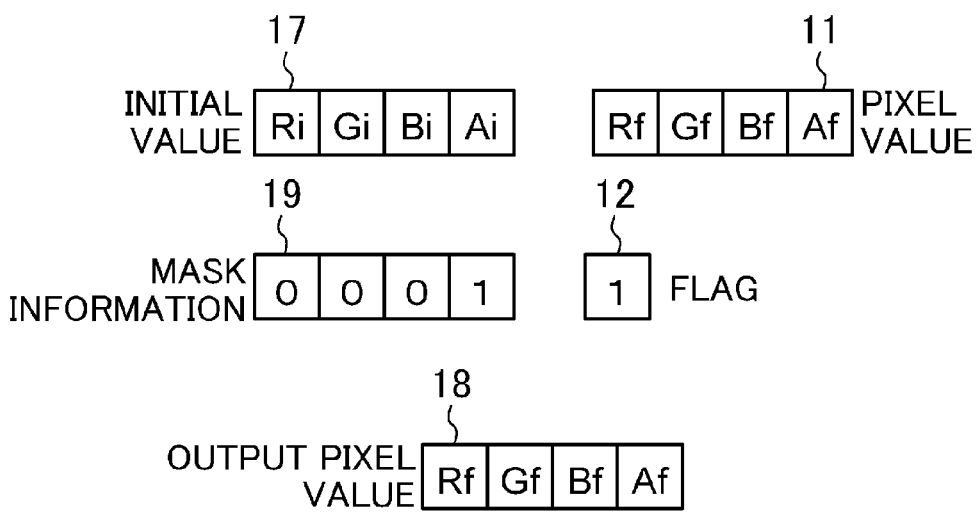
FIG. 9 is a diagram showing how mask information is used where a flag in the image drawing/displaying device of FIG. 1 is "1."
Figure 10:
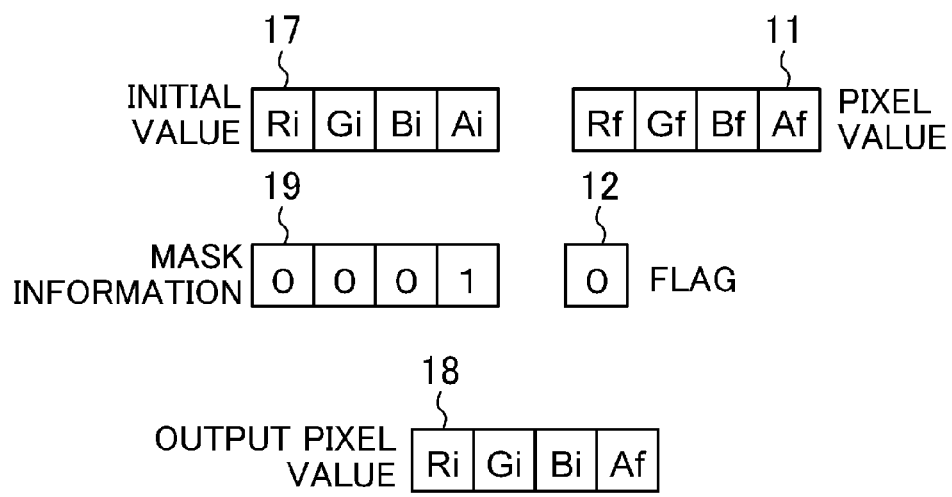
FIG. 10 is a diagram showing how the mask information is used where the flag in the image drawing/displaying device of FIG. 1 is "0."

FIGS. 9 and 10 are diagrams showing how the mask information is used in the flag determination unit 16 of FIG. 1. FIG. 9 shows a case where the flag is "1" (non-initial state) and FIG. 10 indicates a case where the flag is "0" (initial state).

Here, it is assumed that each pixel value includes four components R, G, B, and A, and 1-bit mask information is assigned to each component. Note that the components R, G, and B represent red, green, and blue, respectively, and the component A represents semi-transparency. Under this assumption, it is assumed that the initial pixel value storage unit 17 stores four initial pixel value components Ri, Gi, Bi, and Ai, the image memory 11 stores four pixel value components Rf, Gf, Bf, and Af, and the mask information storage unit 19 stores 4-bit mask information 0001.

In this case, for the components R, G, and B for which the mask information indicates "0" which indicates permission of initialization, as described above, the flag determination unit 16, when the display unit 18 reads pixel values from the image memory 11 after drawing has been performed, reads flags in the flag memory 12 corresponding to the pixels in order to determine whether or not each of the pixels is in the initial state, and if the corresponding flag is "1" (non-initial state) as shown in FIG. 9, the pixel value components Rf, Gf, and Bf are supplied from the image memory 11 to the display unit 18, and if the corresponding flag is "0" (initial state) as shown in FIG. 10, the initial pixel value components Ri, Gi, and Bi are supplied from the initial pixel value storage unit 17 to the display unit 18.

On the other hand, for the component A for which the mask information indicates "1" which indicates forbiddance of initialization, when the display unit 18 reads pixel values from the image memory 11 after drawing has been performed, as shown in FIGS. 9 and 10 no matter whether the flag corresponding to the pixel is "1" (non-initial state) or "0" (initial state), the pixel value component Af is supplied from the image memory 11 to the display unit 18 without using the initial pixel value component Ai from the initial pixel value storage unit 17.

As a result, operation can be performed in accordance with an application program interface (API) for clearing using a mask. The clearing using a mask is, for example, to clear (or not clear) only the component A of the components R, G, B, and A of a pixel. In this technique, a semi-transparent pattern may always be stored, and may be superimposed on another image.

Next, the pixel value reading unit 20 will be described. When the drawing unit 14 reads a pixel value from the image memory 11 in order to mix a pixel for execution of semi-transparent drawing, the pixel value reading unit 20 reads a flag in the flag memory 12 corresponding to the pixel based on the coordinate values of the pixel to be read in order to determine whether or not the pixel is in the initial state, and if the flag is still "0" (initial state), supplies the initial pixel value from the initial pixel value storage unit 17 to the drawing unit 14, and otherwise, i.e., if the flag is "1" (non-initial state), reads the pixel value from the image memory 11 and supplies the pixel value to the drawing unit 14. The drawing unit 14 mixes a value supplied from the pixel value reading unit 20 with a pixel value to be drawn at a predetermined ratio, and writes the resultant pixel value to the image memory 11 via the non-initialization unit 15. In this case, the non-initialization unit 15 changes the flag of the pixel in the flag memory 12 from "0" (initial state) to "1" (non-initial state). An operation which is performed after drawing has been completed is similar to that described above.

Thus, even when it is necessary to read pixel values from the image memory 11 in order to perform semi-transparent drawing, read access to the image memory 11 can be reduced by determining the flag of each pixel stored in the flag memory 12. As a result, for example, if semi-transparent drawing is performed over the entire screen of 1920 pixels (height)×1080 pixels (width), read access of 1920×1080× 4=8,294,400 bytes from the image memory 11 can be reduced.

Note that, in this embodiment, if the flag memory 12 is an internal memory in an LSI device, external memory access can be further reduced. In addition, the frequency of IO operation of an LSI device, which has high power consumption, can be reduced.

Second Embodiment

Figure 11:
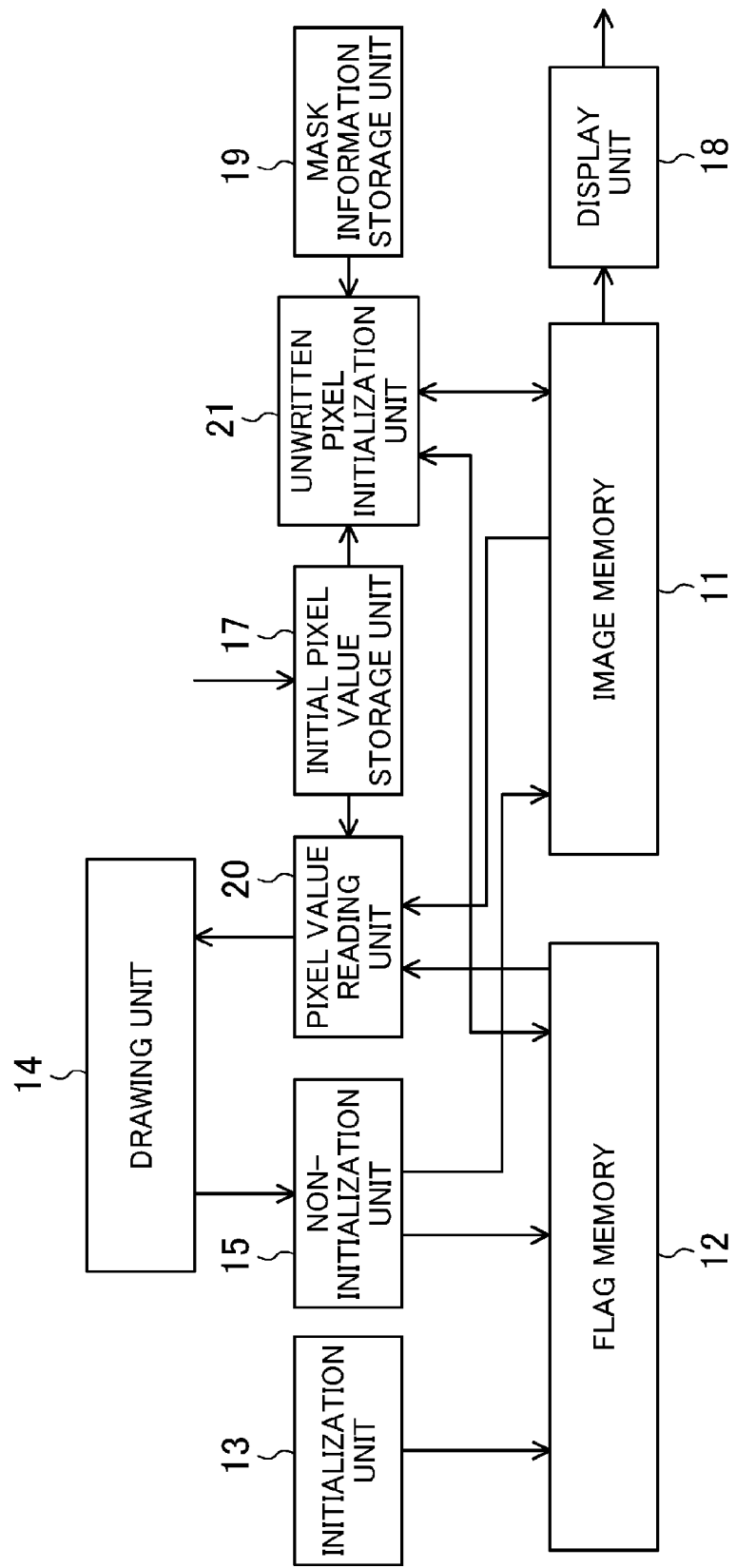
FIG. 11 is a block diagram showing a configuration of an image drawing/displaying device according to a second embodiment of the present disclosure.

FIG. 11 is a block diagram showing a configuration of an image drawing/displaying device according to a second embodiment of the present disclosure. In FIG. 11, the same parts as those of FIG. 1 are indicated by the same reference characters and will not be described.

The image drawing/displaying device of FIG. 11 includes an unwritten pixel initialization unit 21 instead of the flag determination unit 16. After drawing has been completed, the unwritten pixel initialization unit 21 rewrites pixels in the initial state with an initial pixel value stored in the initial pixel value storage unit 17 based on the flags of the pixels in the flag memory 12.

In the image drawing/displaying device of second embodiment, the same operation as that of the first embodiment is performed until the end of drawing by the drawing unit 14. At this time, the image memory 11 and the flag memory 12 are in the states shown in FIG. 7. In the second embodiment, after the image drawing/displaying device has transitioned to such a state, the unwritten pixel initialization unit 21 sequentially checks the values of the flags in the flag memory 12, and if a flag is still "0" (initial state), rewrites a pixel in the image memory 11 corresponding to that flag with the initial pixel value stored in the initial pixel value storage unit 17. If the values of all flags have been sequentially checked and pixels which should be in the initial state have been initialized, the image memory 11 is in the same state as that of the image output to the display unit 18 of FIG. 8. Thereafter, the display unit 18 can display the image of FIG. 8 by reading it from the image memory 11.

Also in this embodiment, the mask information storage unit 19 stores mask information indicating which of a plurality of components of each pixel is forbidden to be initialized. The mask information is used in the unwritten pixel initialization unit 21 as follows. Specifically, for a component for which the mask information indicates initialization permission "0," as described above, the unwritten pixel initialization unit 21 sequentially checks the values of the flags in the flag memory 12, and if a flag is still "0" (initial state), rewrites a pixel in the image memory 11 corresponding to that flag with the initial pixel value component stored in the initial pixel value storage unit 17. On the other hand, for a component for which the mask information indicates initialization forbiddance "1," the pixel value component in the image memory 11 remains unchanged from the previous state no matter whether the flag is "1" (non-initial state) or "0" (initial state).

In this embodiment, the flag determination unit 16 of the first embodiment is not required. Generally speaking, in many cases, the display unit 18 is a separate unit. Therefore, when the configuration of the second embodiment is employed, the display unit 18 which is the same as a conventional one can be used, and at the same time, when an image is read from a CPU etc. after drawing has been completed, the same data as that is obtained when the image drawing/displaying device of this embodiment is not used can be obtained, which is convenient.

Third Embodiment

Figure 12:
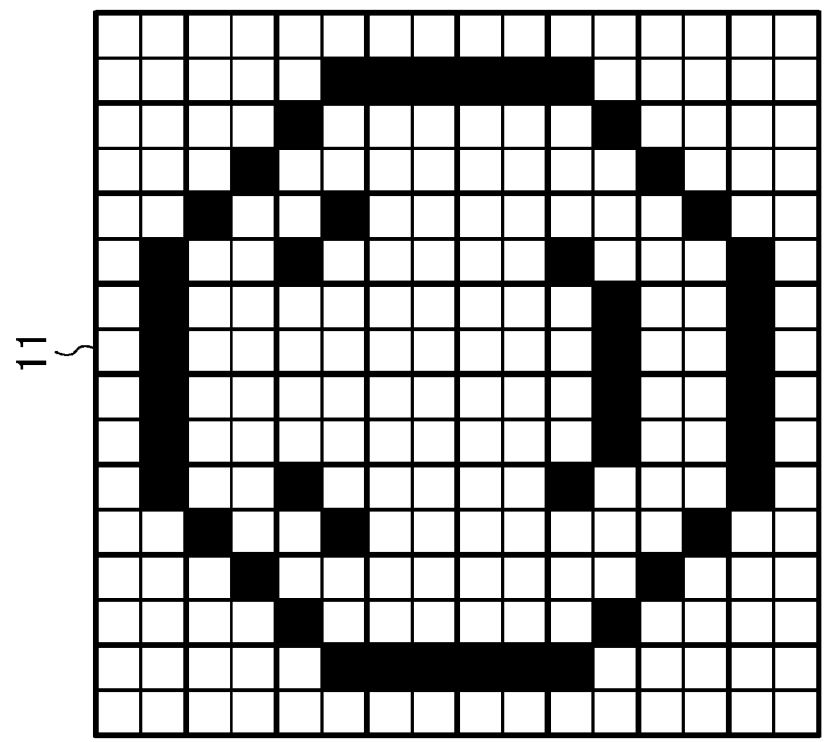
FIG. 12 is a diagram showing example states of the image memory and the flag memory of an image drawing/displaying device according to a third embodiment of the present disclosure.

FIG. 12 is a diagram showing example states of the image memory 11 and the flag memory 12 of an image drawing/displaying device according to a third embodiment of the present disclosure. The device has a configuration similar to that of FIG. 1, for example. Note that this embodiment can be implemented using the configuration of FIG. 11.

In FIG. 12, this embodiment is different from the first embodiment in that four pixels constituting a block of two pixels (height)×two pixels (width) in the image memory 11 are managed using one flag in the flag memory 12.

According to this embodiment, when the drawing unit 14 performs drawing on a pixel, the non-initialization unit 15 reads a flag corresponding to the block including the pixel from the flag memory 12, and if the flag is "0" (initial state), changes the flag to "1" (non-initial state), and writes the desired pixel value to the image memory 11 on a pixel-by-pixel basis, and rewrites the other pixels in the block including that pixel with the initial pixel value stored in the initial pixel value storage unit 17.

After the drawing unit 14 has completed drawing, when the display unit 18 reads image data from the image memory 11 for display, the flag determination unit 16 checks the values of the flags in the flag memory 12 on a block-by-block basis, if a flag is still "0" (initial state), transfers the initial pixel value stored in the initial pixel value storage unit 17 to the display unit 18 for the corresponding four pixels, and if a flag is "1" (non-initial state), reads the pixel values of the four pixels in the corresponding block from the image memory 11 and transfers the pixel values to the display unit 18.

Also in this embodiment, the mask information storage unit 19 stores mask information indicating which of a plurality of components of each pixel is forbidden to be initialized. For a component for which the mask information indicates initialization forbiddance "1," the non-initialization unit 15 keeps the pixel value component in the image memory 11 unchanged from the previous state no matter whether the flag of the block indicates the non-initial state "1" or the initial state "0."

According to this embodiment, the capacity of the flag memory 12 can be reduced compared to the first and second embodiments. Although, in this embodiment, each block includes four pixels, each block may include a larger number of pixels. If the number of pixels in each block is set to be equal to the number of pixels in each block which is the unit of memory access, the compatibility with memory access is increased.

Note that all of the above embodiments are applicable to the management of the state of the Z buffer used in 3D graphics. For example, the reading of the depth value of each pixel in Z buffering, which is a technique of removing a hidden surface, is performed instead of the reading of pixel values for semi-transparent superimposition of pixels, initial read access to the Z buffer in the initial state can be reduced. In Z buffering, the depth value is read each time, and therefore, memory access is significantly reduced.

All of the above embodiments can be implemented by software as well as hardware.

As described above, the image drawing/displaying device of the present disclosure, which includes a flag memory for determining the drawing state of each pixel, is useful as memory access reduction means in applications which require memory initialization at the beginning in addition to computer graphics.

What is claimed is:
1. An image drawing/displaying device comprising:
    an image memory configured to store data of an image to be displayed on a screen;

an initial pixel value storage unit configured to store an initial pixel value;

a flag memory configured to store a flag indicating whether or not a corresponding one of pixels of the screen is in an initial state;

a drawing unit configured to write data of an image to be drawn to the image memory;

a non-initialization unit configured to, when writing has been performed on the image memory, changes a value of the flag of a corresponding pixel in the flag memory from a first value indicating that the pixel is in the initial state to a second value indicating that the pixel is not in the initial state;

a display unit configured to read a pixel value from the image memory to display an image on the screen;

a flag determination unit configured to, when the display unit reads a pixel value from the image memory, read the flag corresponding to the pixel from the flag memory to determine whether or not the pixel is in the initial state, and if the flag still has the first value, supply the initial pixel value stored in the initial pixel value storage unit to the display unit, and otherwise, read the pixel value from the image memory and supplying the pixel value to the display unit; and a mask information storage unit configured to store mask information indicating which of a plurality of components possessed by each pixel of the screen is forbidden to be initialized, wherein the flag determination unit looks up the mask information stored in the mask information storage unit, and for a component forbidden to be initialized, reads the component of a pixel value from the image memory and supplies the component of the pixel value to the display unit irrespective of the value of the corresponding flag in the flag memory.

2. The image drawing/displaying device of claim 1, further comprising:

an initialization unit configured to change the values of all of the flags in the flag memory to the first value before beginning to process one screen of data.

3. The image drawing/displaying device of claim 1, wherein the flag memory is configured to manage, using one flag, information indicating whether or not a block including a plurality of pixels in the image memory is in an initial state, and the flag having a first value when the block is in the initial state and a second value when the block is not in the initial state, and the non-initialization unit has a function of, when the drawing unit performs drawing on a pixel, reading the flag of the block including the pixel from the flag memory, and if the flag still has the first value, changing the value of the flag to the second value, and rewriting the other pixels in the block including the pixel in the image memory with the initial pixel value stored in the initial pixel value storage unit.

4. The image drawing/displaying device of claim 3, wherein the non-initialization unit looks up the mask information stored in the mask information storage unit, and for a component forbidden to be initialized, does not rewrite the component of a pixel value in the image memory irrespective of the value of the flag in the flag memory corresponding to the block including a pixel for which drawing is to be performed.

5. The image drawing/displaying device of claim 1, further comprising:

a pixel value reading unit configured to, when reading a pixel value from the image memory so that the drawing unit performs semi-transparent drawing, read the flag corresponding to the pixel from the flag memory to determine whether or not the pixel is in the initial state, and if the flag still has the first value, supply the initial pixel value stored in the initial pixel value storage unit to the drawing unit, and otherwise, read the pixel value from the image memory and supply the pixel value to the drawing unit.

6. The image drawing/displaying device of claim 1, wherein at least a portion of a function of each of the units is implemented by software.

7. An image drawing/displaying device comprising:

an image memory configured to store data of an image to be displayed on a screen;

an initial pixel value storage unit configured to store an initial pixel value;

a flag memory configured to store a flag indicating whether or not a corresponding one of pixels of the screen is in an initial state;

a drawing unit configured to write data of an image to be drawn to the image memory;

a non-initialization unit configured to, when writing has been performed on the image memory, changes a value of the flag of a corresponding pixel in the flag memory from a first value indicating that the pixel in the initial state to a second value indicating that the pixel is not in the initial state;

an unwritten pixel initialization unit configured to, after drawing has been completed by the drawing unit, check the value of each flag in the flag memory, and if the flag still has the first value, rewrite a pixel value corresponding to the flag in the image memory with the initial pixel value stored in the initial pixel value storage unit;

a display unit configured to, after writing has been completed by the unwritten pixel initialization unit, read a pixel value from the image memory to display an image on the screen;

a mask information storage unit configured to store mask information indicating which of a plurality of components possessed by each pixel of the screen is forbidden to be initialized, wherein the unwritten pixel initialization unit looks up the mask information stored in the mask information storage unit, and for a component forbidden to be initialized, does not rewrite the component of a pixel value in the image memory irrespective of the value of the corresponding flag in the flag memory.

8. The image drawing/displaying device of claim 7, further comprising:

an initialization unit configured to change all of the flags in the flag memory to the initial state before beginning to process one screen of data.

9. The image drawing/displaying device of claim 7, wherein the flag memory is configured to manage, using one flag, information indicating whether or not a block including a plurality of pixels in the image memory is in an initial state, and the flag has a first value when the block is in the initial state and a second value when the block is not in the initial value, and the non-initialization unit has a function of, when the drawing unit performs drawing on a pixel, reading the flag of the block including the pixel from the flag memory, and if the flag still has the first value, changing the value of the flag to the second value, and rewriting the other pixels in the block including the pixel in the image memory with the initial pixel value stored in the initial pixel value storage unit.

10. The image drawing/displaying device of claim 9, wherein the non-initialization unit looks up the mask information stored in the mask information storage unit, and for a component forbidden to be initialized, does not rewrite the component of a pixel value in the image memory irrespective of the value of the flag in the flag memory corresponding to the block including a pixel for which drawing is to be performed.

11. The image drawing/displaying device of claim 7, further comprising:
a pixel value reading unit configured to, when reading a pixel value from the image memory so that the drawing unit performs semi-transparent drawing, read a flag corresponding to the pixel from the flag memory to determine whether or not the pixel is in the initial state, and if the flag still has the first value, supply the initial pixel value stored in the initial pixel value storage unit to the drawing unit, and otherwise, read the pixel value from the image memory and supply the pixel value to the drawing unit.

12. The image drawing/displaying device of claim 7, wherein at least a portion of a function of each of the units is implemented by software.

\* \* \* \* \*